(12) United States Patent
Nomura

(10) Patent No.: US 10,279,529 B2
(45) Date of Patent: May 7, 2019

(54) EXTRUSION MACHINE

(71) Applicants: FUJI SEIKO CO., LTD., Hashima-shi, Gifu-ken (JP); FUJI SHOJI CO., LTD., Hashima-cho, Gifu-ken (JP)

(72) Inventor: Shigeaki Nomura, Hashima (JP)

(73) Assignees: FUJI SEIKO CO., LTD. (JP); FUJI SHOJI CO., LTD. (JP)

(*) Notice: Subject to any disclaimer, the term of this patent is extended or adjusted under 35 U.S.C. 154(b) by 91 days.

(21) Appl. No.: 15/119,529

(22) PCT Filed: Feb. 26, 2014

(86) PCT No.: PCT/JP2014/054607
§ 371 (c)(1),
(2) Date: Aug. 17, 2016

(87) PCT Pub. No.: WO2015/128949
PCT Pub. Date: Sep. 3, 2015

(65) Prior Publication Data
US 2017/0008213 A1 Jan. 12, 2017

(51) Int. Cl.
*B29C 47/08* (2006.01)
*B29C 47/00* (2006.01)
(Continued)

(52) U.S. Cl.
CPC ...... *B29C 47/0828* (2013.01); *B29C 47/0822* (2013.01); *B29C 47/0019* (2013.01); *B29C 47/14* (2013.01); *B29K 2021/00* (2013.01)

(58) Field of Classification Search
CPC ....... B29C 47/12; B29C 47/124; B29C 47/14; B29C 47/0822; B29C 47/0828; B29C 47/009; B29C 47/0818
(Continued)

(56) References Cited

U.S. PATENT DOCUMENTS 3,488,807 A * 1/1970 Vossen ................ B29C 47/0822
425/192 R
4,124,346 A * 11/1978 Greenwood ........ B29C 47/0822
425/188
(Continued)

FOREIGN PATENT DOCUMENTS

JP 5-192981 A 8/1993
JP 9-29817 A 2/1997
(Continued)

OTHER PUBLICATIONS

International Search Report for Application No. PCT/JP2014/054607 dated Apr. 28, 2014.
(Continued)

*Primary Examiner* — Joseph S Del Sole
*Assistant Examiner* — Mohamed K Ahmed Ali
(74) *Attorney, Agent, or Firm* — Tarolli, Sundheim, Covell & Tummino LLP

(57) ABSTRACT

Disclosed is an extrusion machine including a head body and a die seat arranged on a front surface of the head body. A die is attached in a removable manner to the die seat. The die includes an extrusion outlet that is in communication with an opening through which plastic material is discharged out of the head body. A holding member is in contact with a front surface of the die. A pressing mechanism presses the holding member against the front surface of the die.

4 Claims, 4 Drawing Sheets

(51) Int. Cl.
*B29C 47/14* (2006.01)
*B29K 21/00* (2006.01)

(58) Field of Classification Search
USPC .............................................. 425/191, 192 R
See application file for complete search history.

(56) References Cited

U.S. PATENT DOCUMENTS

| | | | | |
|---|---|---|---|---|
| 4,652,224 | A * | 3/1987 | Golisch | B29C 47/0822 425/131.1 |
| 5,762,975 | A * | 6/1998 | Rockstedt | B29C 47/0014 425/186 |
| 6,244,849 | B1 * | 6/2001 | Bailey | B29C 47/0822 425/188 |
| 6,589,454 | B1 * | 7/2003 | Santelli, Jr. | B29C 47/124 264/145 |
| 2006/0090322 | A1 * | 5/2006 | Ciliske | B05C 5/0254 29/428 |

FOREIGN PATENT DOCUMENTS

| | | |
|---|---|---|
| JP | 2003-117982 A | 4/2003 |
| JP | 2003-266518 A | 9/2003 |
| JP | 2005-219274 A | 8/2005 |
| JP | 2008-000946 A | 1/2008 |
| SU | 1761530 | 9/1992 |

OTHER PUBLICATIONS

International Preliminary Report on Patentability for Application No. PCT/JP2014/054607 dated Aug. 30, 2016.
Office Action for corresponding Russian application No. 2016137491, dated Dec. 28, 2017.

* cited by examiner

EXTRUSION MACHINE

RELATED APPLICATIONS

The present invention is a U.S. National Stage under 35 USC 371 patent application, claiming priority to Serial No. PCT/JP2014/054607, filed on 26 Feb. 2014; the entirety of which is incorporated herein by reference.

TECHNICAL FIELD

The present invention relates to an extrusion machine that extrudes a plastic material such as rubber.

BACKGROUND ART

Patent document 1 and patent document 2 disclose extrusion machines. The extrusion machines each have a head the distal end of which a die is attached to. The die includes an extrusion outlet that determines the extruded shape of plastic material.

PRIOR ART DOCUMENTS

Patent Documents

Patent Document 1: Japanese Laid-Open Patent Publication No. 2003-266518
Patent Document 2: Japanese Laid-Open Patent Publication No. 2008-946

SUMMARY OF THE INVENTION

Problems that are to be Solved by the Invention

When changing, for example, the extruded shape of the plastic material, the die needs to be replaced by a die with an extrusion outlet having a different shape or size. In such a case, the dies need to be configured in a manner that allows for attachment and removal to and from the extrusion machine head. However, this may result in the leakage of plastic material from the boundary between the extrusion machine head and the die.

It is an objective of the present invention to provide an extrusion machine that prevents the leakage of plastic material from between the extrusion machine head and the die even when the extrusion machine is configured to allow for replacement of the die.

Means for Solving the Problems

To achieve the above objective, the present invention provides an extrusion machine including a head body and a die seat arranged on a front surface of the head body. A die is attached in a removable manner to the die seat. The die includes an extrusion outlet that is in communication with an opening through which plastic material is discharged out of the head body. A holding member is in contact with a front surface of the die. A pressing mechanism presses the holding member against the front surface of the die.

Accordingly, the pressing mechanism presses the die against the front surface of the head with the holding member, and the leakage of rubber from between the head and the die is prevented in a suitable manner.

The pressing mechanism may include a bolt that presses the die against the die seat, a first member coupled to the holding member, a second member to which force is applied in one direction when the pressing produces a reaction force acting on the bolt, and a cam surface arranged between the first member and the second member. The cam surface causes the force applied in the one direction to the second member to act on the holding member toward the die.

Accordingly, when tightening the die with the bolt, the resulting reaction force causes the cam effect of the cam surfaces to produce a force acting on the holding member toward the die with the second member so that the die is pressed against the head. Thus, the die can be pressed against the die seat and also pressed against the front surface of the head with a single bolt. This simplifies the structure for fixing the die and facilitates the task for fastening the die.

Further, the cam surface converts the fastening movement of the bolt to pressing force of the holding member. Thus, the die can be strongly pressed against the head with a light force that rotates the bolt. This further ensures the prevention of plastic material leakage.

Effect of the Invention

The present invention succeeds in improving the function for preventing leakage of plastic material from between the extrusion machine head and the die.

MODES FOR CARRYING OUT THE INVENTION

One embodiment of an extrusion machine according to the present invention will now be described.

Figure 2:
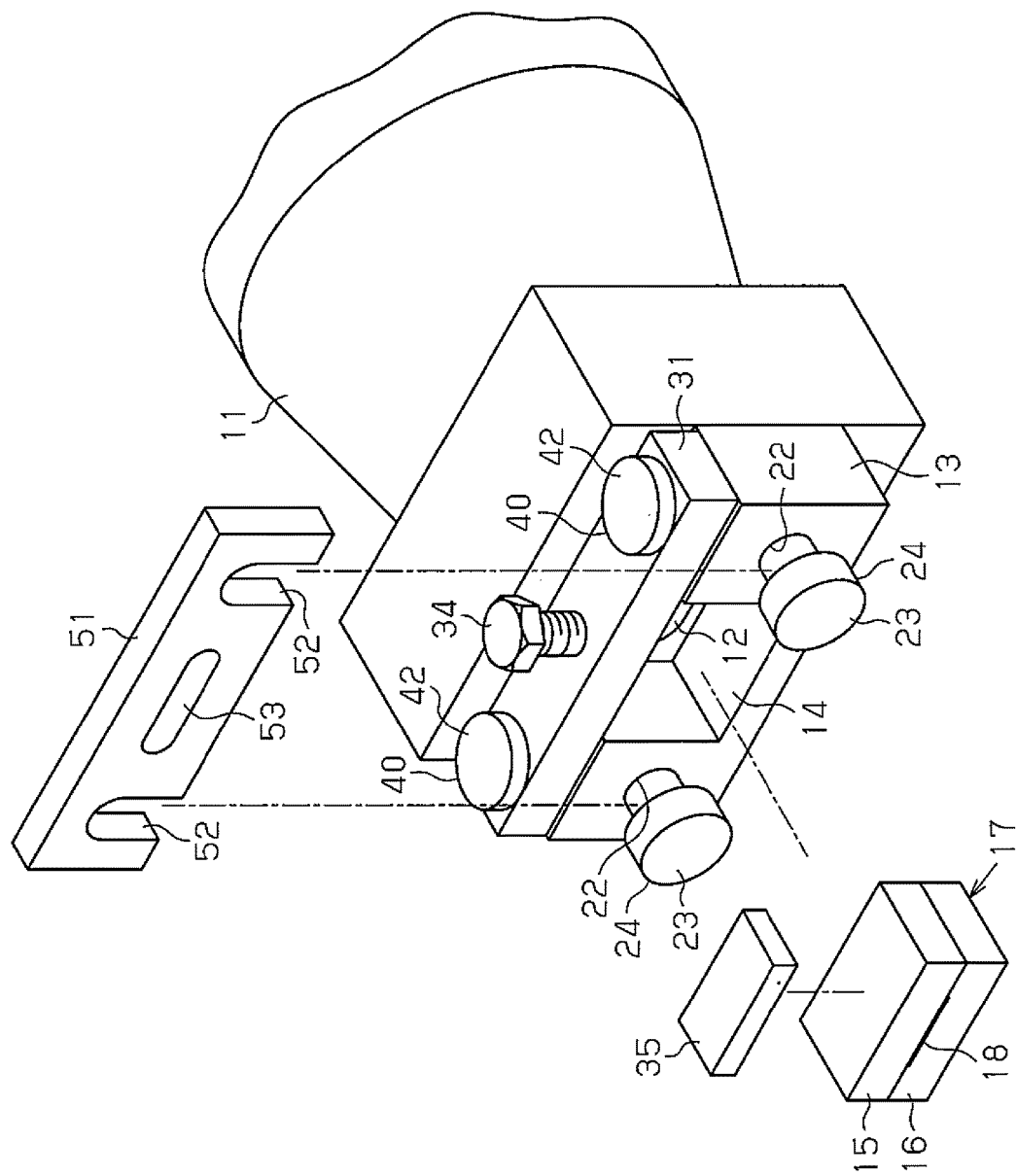
FIG. 2 is an exploded perspective view of the extrusion machine head portion.
Figure 6:
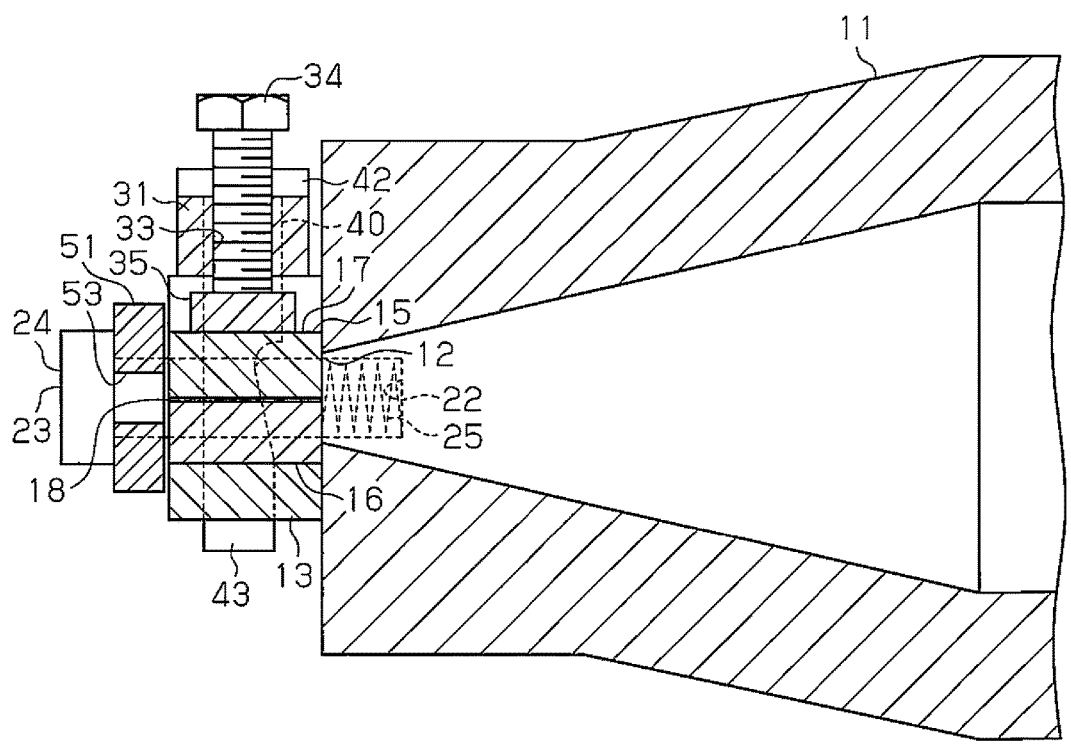
FIG. 6 is a cross-sectional view taken along line 6-6 in FIG. 3.

As shown in FIGS. 2 and 6, a head 11 (head body) of the rubber extrusion machine has a distal end that includes an opening 12 for discharging rubber. A screw is arranged in the head 11 to feed rubber. The screw is not illustrated in the drawings of the embodiment. A die seat 13 is fixed to the distal end of the head 11.

Figure 1:
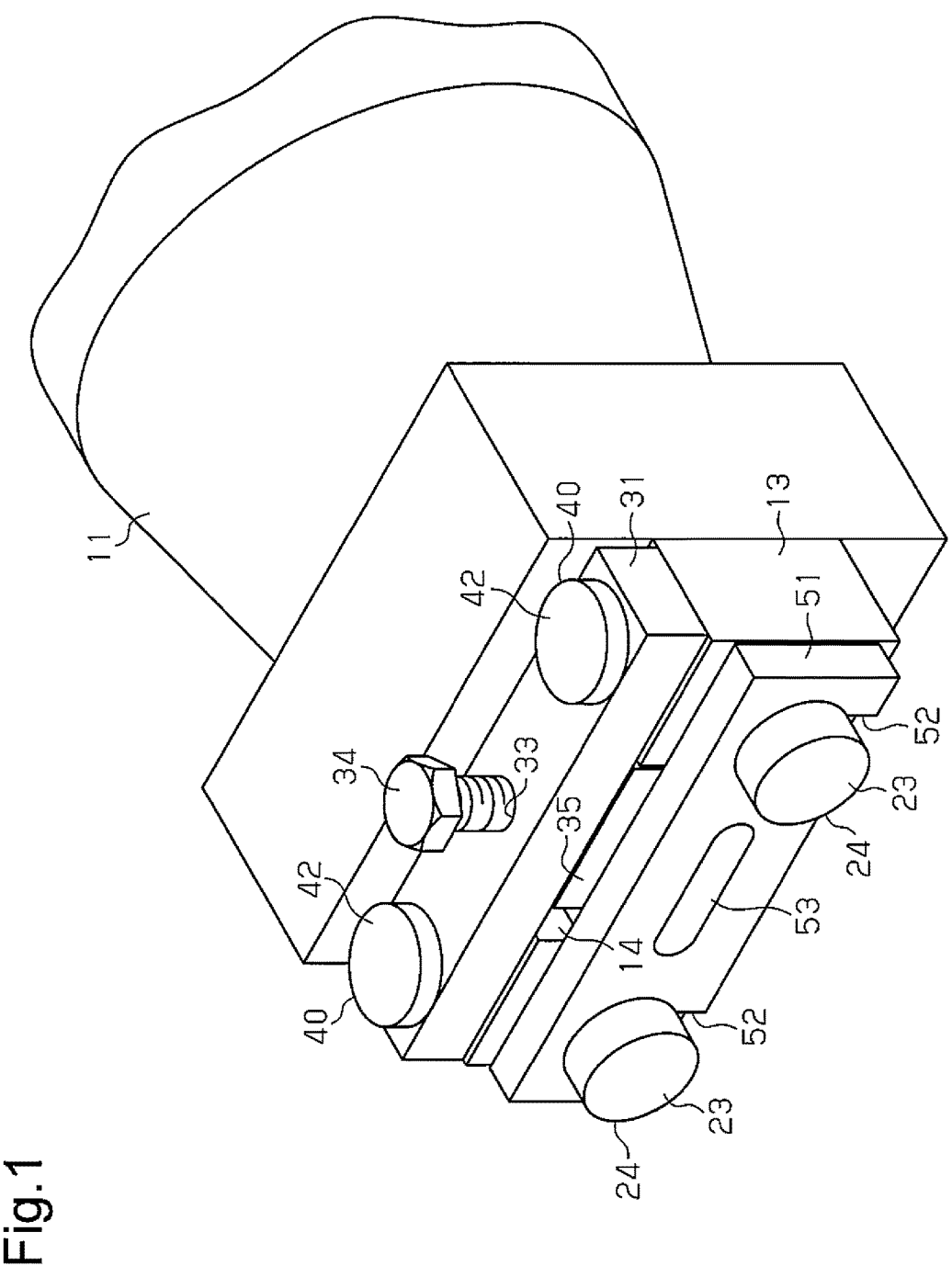
FIG. 1 is a perspective view showing an extrusion machine head portion according to an embodiment of the present invention.
Figure 3:
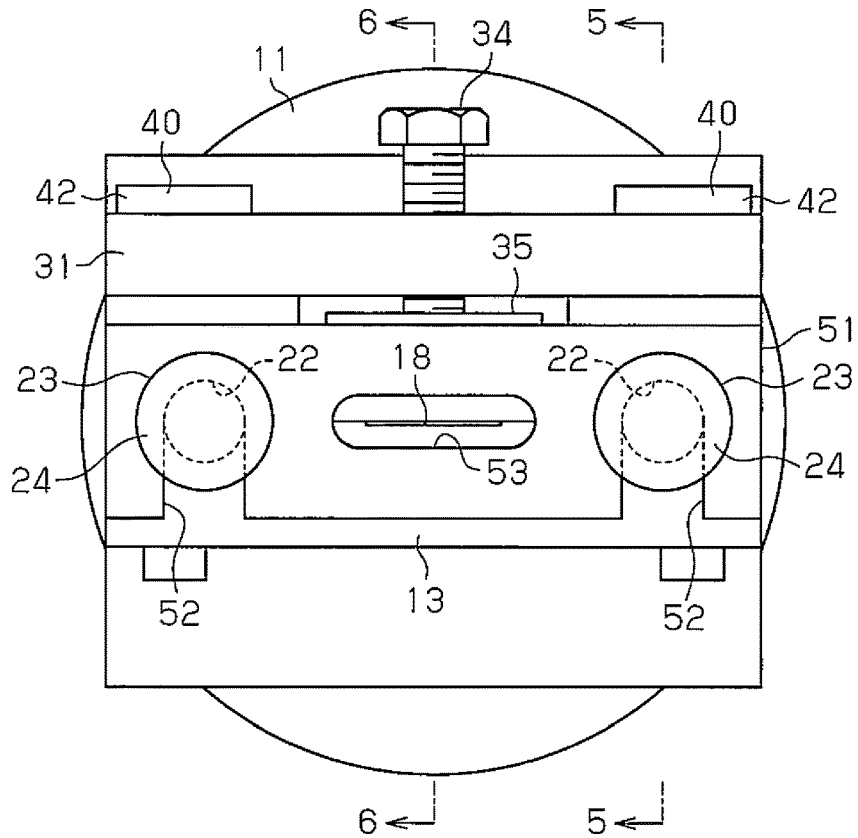
FIG. 3 is a front view of the extrusion machine head portion.

As shown in FIGS. 1, 2, and 3, the die seat 13 includes an adapter 14 that is open toward the front and upper directions. A die 17, which is formed by stacking upper and lower die pieces 15 and 16, is attached to the adapter 14 in a removable manner. An extrusion outlet 18, which is in communication with the opening 12, extends between the die pieces 15 and 16. The rubber in the head 11 is extruded toward the front through the opening 12 and out of the extrusion outlet 18.

Figure 5:
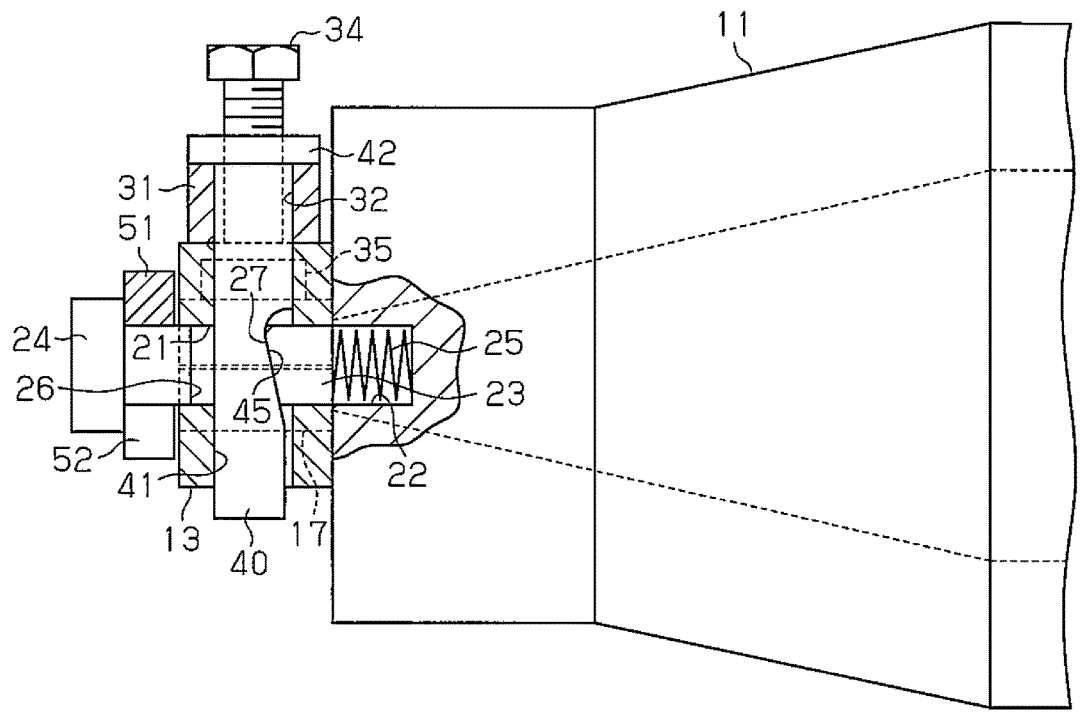
FIG. 5 is a cross-sectional view taken along line 5-5 in FIG. 3.

As shown in FIG. 5, first bores 21, which are horizontal, extend through the die seat 13 and the head 11 at opposite sides of the adapter 14. A first shaft 24, which includes a head 23, is inserted into each first bore 21. The first bore 21 includes a deep portion 22 that accommodates a spring 25. The spring 25 biases the first shaft 24 toward the front.

Figure 4:
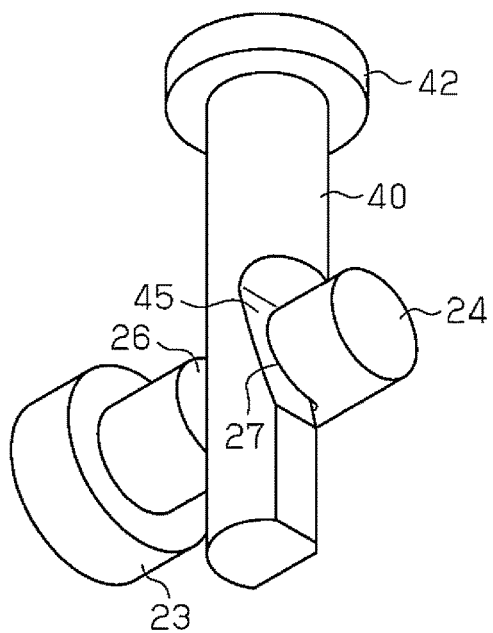
FIG. 4 is a perspective view showing a second shaft and a first shaft.

As shown in FIG. 4, the longitudinally central portion of the first shaft 24 includes a recess 26. A sloped cam surface 27 is formed in the recess 26.

As shown in FIGS. 1 and 5, a set member 31 is arranged on the die seat 13. Second upper bores 32 extend in the vertical direction through the set member 31 at its two ends. A bolt bore 33 extends in the vertical direction through the set member 31 between the two second upper bores 32. A tightening bolt 34 is fastened to the bolt bore 33. The distal end of the tightening bolt 34 is in contact with the upper surface of an abutment plate 35, which is located on the die 17 and separate from the die 17. The bolt 34 is tightened on the abutment plate 35 to press the die pieces 15 and 16 against each other and also press the die 17 against the inner bottom surface of the adapter 14 in the die seat 13.

As shown in FIGS. 1 and 5, second lower bores 41, which are opposed to the second upper bores 32, extend in the vertical direction through the die seat 13 at its two ends. The second lower bores 41 intersect the first bores 21 of the die seat 13. Second shafts 40 are inserted into the second upper bores 32 and the second lower bores 41. The upper end of each second shaft 40 includes a head 42 located on the upper surface of the set member 31.

As shown in FIGS. 4 and 5, the vertically middle portion of each second shaft 40 includes a sloped cam surface 45. The biasing force of the spring 25 causes the cam surface 27 of the first shaft 24 to contact the cam surface 45.

As shown in FIGS. 2 and 5, a plate-like holding member 51 is located between the heads 23 of the first shafts 24 and the die 17. The holding member 51 has two ends including recesses 52 at which the holding member 51 is held above the first shafts 24. In this state, the first shafts 24 are coupled to the holding member 51. The central portion of the holding member 51 includes an opening 53 that corresponds to the extrusion outlet 18. The rubber discharged from the extrusion outlet 18 of the die 17 passes through the opening 53 and toward the front.

In the present embodiment, the first shafts 24, the cam surfaces 27, the set member 31, the bolt 34, the second shafts 40, and the cam surfaces 45 form a pressing mechanism. The first shafts 24 form a first member, and the set member 31 and the second shafts 40 form a second member.

The operation of the extrusion machine will now be described.

FIG. 1 shows a state in which the extrusion machine is operable. The screw (not shown) in the head 11 is rotated to extrude rubber from the extrusion outlet 18 so that the rubber has a cross-section shape that is in accordance with the shape and size of the extrusion outlet 18.

In this state, the lower end of the bolt 34 greatly projects downward. Thus, the lower end of the bolt 34 contacts the upper surface of the abutment plate 35 and tightens the abutment plate 35. This produces a reaction force that acts on the bolt 34, and a force acts on the set member 31 in a rising direction so that the set member 31 lifts the first shafts 24.

Consequently, the cam surface 27 of the first shaft 24 and the cam surface 45 of the second shaft 40 are pressed against each other, and the cam effect of the cam surfaces 27 and 45 pulls the first shaft 24 toward the head 11. Thus, the head 23 of the first shaft 24 applies a moving force directed toward the head 11 to the holding member 51. The holding member 51 presses the die 17 against the front surface of the head 11. As described above, the cam surfaces 27 and 45 apply a force to the first shaft 24 in one direction that acts toward the die 17 on the holding member 51. This effectively produces an effect that prevents leakage of rubber from between the die 17 and the front surface of the head 11.

When the cam surface 45 of the second shaft 40 and the cam surface 27 of the first shaft 24 are pressed against each other, the lifting of the second shaft 40 is restricted. Thus, the set member 31 is restricted from being lifted with being pressed against the heads 42 of second shafts 40. As a result, downward movement of the bolt 34 tightens the upper surface of the abutment plate 35 with the distal side of the bolt 34. This presses the die 17 against the inner bottom surface of the adapter 14 in the die seat 13 and presses the die pieces 15 and 16 against each other. Accordingly, the leakage of rubber from between the die pieces 15 and 16 is effectively prevented.

When replacing the die 17 with one including an extrusion outlet 18 having a different shape or when cleaning the die 17, the die 17 is removed from the extrusion machine. More specifically, the bolt 34, which tightens the abutment plate 35, is loosened. This decreases the downward projecting amount of the lower end of the bolt 34. Thus, the tightening force acting on the die 17 through the abutment plate 35 is weakened, the force pressing the die 17 against the inner bottom surface of the adapter 14 in the die seat 13 is weakened, and the force pressing the die pieces 15 and 16 against each other is weakened.

When the force pressing the bolt 34 against the abutment plate 35 is weakened, the lifting force that acts on each second shaft 40 through the set member 31 is decreased. Thus, the state in which the cam surfaces 27 and 45 are pressed against each other is cancelled, and forward movement of the first shaft 24 is allowed. The spring 25 moves the first shaft 24 toward the front. Thus, the pressing of the head 23 of the first shaft 24 against the holding member 51 is cancelled, the pressing of the holding member 51 against the die 17 is cancelled, and the holding member 51 is separated from the first shaft 24.

In this manner, the die 17 is released from the fixed state, and the die 17 can be removed from the extrusion machine.

When attaching another die 17 to the extrusion machine, the removing procedures described above are reversed.

The present embodiment has the advantages described below.

In the present embodiment, the fastening effect of the bolt 34 is used to press the cam surfaces 27 and 45 against each other. As a result, the holding member 51 presses the die 17 against the front surface of the head 11, and the leakage of rubber from between the head 11 and the die 17 is prevented in a suitable manner. Further, the die pieces 15 and 16 of the die 17 are pressed against each other, and the leakage of rubber from between the die pieces 15 and 16 is also prevented in a suitable manner.

Further, the tightening of the bolt 34 presses the die pieces 15 and 16 of the die 17 against each other with the tightening force, and the effect of the cam surfaces 27 and 45 presses the die 17 against the front surface of the head 11 with the holding member 51. In this manner, only the single bolt 34 needs to be tightened, the structure is simple, and the task is easy. Accordingly, the removal and attachment of the die 17 when replacing or cleaning the die 17 can be quickly and easily performed.

Moreover, the fastening movement of the bolt 34 is converted by the cam surfaces 27 and 45 to force that presses the holding member 51 against the die 17. Thus, the die 17 can be strongly pressed against the head 11 with a light force that rotates the bolt 34. This further ensures the prevention of rubber leakage.

The above embodiment may be modified as described below.

Instead of forming the die 17 with the die pieces 15 and 16, the entire die 17 may be formed by a single integrated block.

The holding member 51 may be coupled to the head 11 of the extrusion machine by a screw, and the screw may be tightened to press the die 17 against the front surface of the head 11.

The sloped cam surfaces 27 and 45 of the first shaft 24 and the second shaft 40 need only be formed on at least one of the first shaft 24 and the second shaft 40.

DESCRIPTION OF REFERENCE CHARACTERS

11: head, 13: die seat, 15: die piece, 16: die piece, 17: die, 24: first shaft, 27: cam surface, 31: setting member, 34: bolt, 40: second shaft, 45: cam surface, 51: holding member.

The invention claimed is:

1. An extrusion machine comprising:
    a head body;
    a die seat arranged on a front surface of the head body;
    a die attached in a removable manner to the die seat, wherein the die includes an extrusion outlet that is in communication with an opening through which plastic material is discharged out of the head body;
    a holding member that is in contact with a front surface of the die; and
    a pressing mechanism that presses the holding member against the front surface of the die, wherein the pressing mechanism includes:
    a bolt that presses the die against the die seat;
    a first member coupled to the holding member;
    a second member to which force is applied in one direction when the pressing produces a reaction force acting on the bolt; and
    a cam surface arranged between the first member and the second member, wherein the cam surface causes the force applied in the one direction to the second member to act on the holding member toward the die.

2. The extrusion machine according to claim 1, wherein the first member includes a first shaft inserted into a first bore of the die seat and provided with a head that is in contact with the holding member,
    the second member includes:
    a set member arranged on the die seat; and
    a second shaft including a head that is in contact with the set member, wherein the second shaft is inserted into a second bore of the set member and the die seat, and
    at least one of the first shaft and the second shaft includes a cam surface that is in contact with the other one of the first shaft and the second shaft.

3. The extrusion machine according to claim 1, wherein the die is formed by two stacked die pieces, an extrusion outlet is formed between the die pieces, and the bolt presses the die pieces against each other.

4. The extrusion machine according to claim 2, wherein the head body includes a spring that biases the first shaft in a direction in which the head of the first shaft moves away from the holding member.

* * * * *